(12) United States Patent
Otani et al.

(10) Patent No.: US 10,088,332 B2
(45) Date of Patent: Oct. 2, 2018

(54) FLIGHT PLAN PREPARING METHOD AND FLYING VEHICLE GUIDING SYSTEM

(71) Applicant: TOPCON Corporation, Tokyo-to (JP)

(72) Inventors: Hitoshi Otani, Tokyo-to (JP); Daisuke Sasaki, Tokyo-to (JP); Nobuyuki Fukaya, Tokyo-to (JP); Takeshi Sasaki, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 87 days.

(21) Appl. No.: 15/421,834

(22) Filed: Feb. 1, 2017

(65) Prior Publication Data
US 2018/0023974 A1 Jan. 25, 2018

(30) Foreign Application Priority Data
Feb. 15, 2016 (JP) .................................. 2016-026146

(51) Int. Cl.
*G05D 1/00* (2006.01)
*G01C 23/00* (2006.01)
(Continued)

(52) U.S. Cl.
CPC ............ *G01C 23/00* (2013.01); *B64C 39/024* (2013.01); *B64D 45/00* (2013.01); *B64D 47/08* (2013.01);
(Continued)

(58) Field of Classification Search
CPC combination set(s) only.
See application file for complete search history.

(56) References Cited

U.S. PATENT DOCUMENTS

| 2014/0240498 | A1* | 8/2014 | Ohtomo | B64D 47/08 348/144 |
| 2014/0371952 | A1* | 12/2014 | Ohtomo | B64C 39/024 701/2 |
| 2015/0220085 | A1* | 8/2015 | Ohtomo | G08G 5/0069 701/2 |

FOREIGN PATENT DOCUMENTS

| CA | 2832956 A1 | 10/2012 |
| EP | 2511781 A1 | 10/2012 |

(Continued)

OTHER PUBLICATIONS

European communication dated Jun. 21, 2017 in corresponding European patent application No. 17155462.9.

*Primary Examiner* — Redhwan K Mawari
(74) *Attorney, Agent, or Firm* — Nields, Lemack & Frame, LLC

(57) ABSTRACT

A flying vehicle has a retro-reflector, a position measuring instrument has a non-prism measurement function for performing a distance measurement and an angle measurement in non-prism and a prism measurement function for performing the distance measurement and the angle measurement with respect to the retro-reflector, a control device is adapted to have a flight range as set within a flat plane, to prepare an approximate flight plan having a two-dimensional approximate flying route as set within the flight range, to measure the approximate flying route by the non-prism measurement, to calculate a three-dimensional detailed flying route based on the measurement results and the approximate flying route, to prepare a detailed flight plan including the detailed flying route and to control the flying vehicle so as to fly in maintaining a distance between the flying vehicle system and a surface of the object to be measured at a constant value based on the detailed flight plan and a result of the prism measurement.

21 Claims, 8 Drawing Sheets

(51) Int. Cl.
  *B64C 39/02* (2006.01)
  *G01C 15/02* (2006.01)
  *G01C 21/00* (2006.01)
  *B64D 45/00* (2006.01)
  *B64D 47/08* (2006.01)
  *G01S 19/42* (2010.01)
  *G05D 1/02* (2006.01)
  *G05D 1/10* (2006.01)

(52) U.S. Cl.
  CPC ........... *G01C 15/02* (2013.01); *G01C 21/005* (2013.01); *G01S 19/42* (2013.01); *G05D 1/0202* (2013.01); *G05D 1/102* (2013.01); *B64C 2201/027* (2013.01); *B64C 2201/108* (2013.01); *B64C 2201/127* (2013.01); *B64C 2201/14* (2013.01); *B64C 2201/146* (2013.01)

(56) References Cited

FOREIGN PATENT DOCUMENTS

| | | |
|---|---|---|
| EP | 2818958 A2 | 12/2014 |
| EP | 3062066 A1 | 8/2016 |
| JP | 2014-167413 A | 9/2014 |
| JP | 2015-1450 A | 1/2015 |
| JP | 2015-145784 A | 8/2015 |

\* cited by examiner

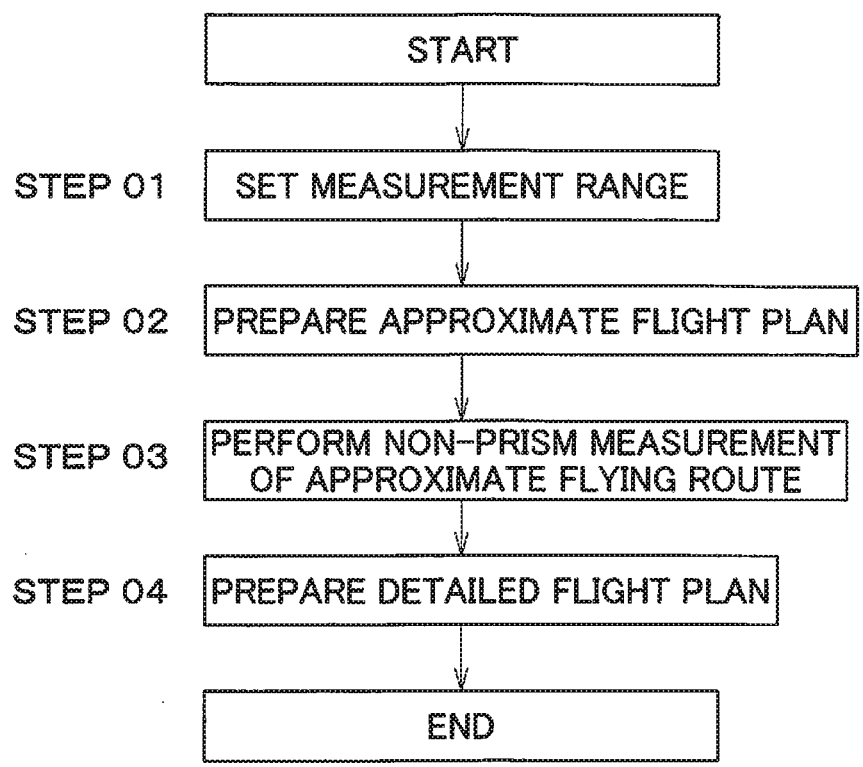

FLIGHT PLAN PREPARING METHOD AND FLYING VEHICLE GUIDING SYSTEM

BACKGROUND OF THE INVENTION

The present invention relates to a flight plan preparing method and a flying vehicle guiding system for executing an autonomous flight of a small type unmanned air vehicle (UAV: Unmanned Air Vehicle).

In recent years, with a progress of a UAV (Unmanned Air Vehicle), various types of apparatuses are installed on the UAV and the UAV is flown by remotely controlling or by autonomously flying and works as required are carried out. For instance, a camera for photogrammetry and a scanner are installed on the UAV, and a measurement is performed downward from above the sky or the measurement is performed at a place where no operator can enter. And, for a positional measurement of the UAV itself, a GPS (Global Positioning System) is installed on the UAV, and a position of the UAV is determined by the GPS.

In a case of carrying out the autonomous flight of the UAV, a flight plan is prepared for defining the measuring range and the flying route based on the information already known such as map data or design drawing of the structures or the like. Further, by performing a flight of the UAV according to the flight plan, regarding the objects to be measured such as bridges, dams, etc., an image is obtained and a measuring is performed.

In the cases of a structure such as bridge, dam, a shape of surface is not constantly flat, and is tilted or curved, or the surface is irregular. However, the flight plan as given above is a two-dimensional flight plan based on the information based on map information and drawings, and no consideration is given on tilting, curving, or irregularity. For this reason, it is not possible to keep a distance between the structure and the UAV at a constant value.

For instance, in a case where the maintenance is performed on a structure, it is necessary to detect a micro crack of about 0.2 mm on concrete surface. A resolution of the images corresponds to the distance to a subject for photography, and in order to detect the micro crack of about 0.2 mm, it is necessary to obtain an image of the structure from a close-in distance of about 2 to 10 meters. However, in a flight plan in the past, it has not been possible to maintain a distance from the structure to the UAV at a constant value, and a photographing has been carried out at a certain predetermined distance where a collision can be avoided, and there have been the cases where it have been difficult to detect the micro crack or the like.

SUMMARY OF THE INVENTION

It is an object of the present invention to provide a three-dimensional flight plan preparing method and a flying vehicle guiding system, which prepare a three-dimensional flying route to maintain a distance between a flying vehicle and an object to be measured at a constant value, and guide the flying vehicle based on the three-dimensional flying route.

To attain the object as described above, a flying vehicle guiding system according to the present invention comprises a flying vehicle system having a measuring device installed and capable of remotely controlling, a position measuring instrument capable of measuring distance, angle and of tracking, a ground base station for controlling a flight of a flying vehicle based on measurement result of the position measuring instrument and a control device installed on the flying vehicle or on the ground base station, wherein the flying vehicle has a retro-reflector, the position measuring instrument has a non-prism measurement function for performing a distance measurement and an angle measurement in non-prism and a prism measurement function for performing the distance measurement and the angle measurement with respect to the retro-reflector, the control device is adapted to have a flight range as set within a flat plane according to map information, drawing or image including an object to be measured, to prepare an approximate flight plan having a two-dimensional approximate flying route as set within the flight range, to measure the approximate flying route by the non-prism measurement, to calculate a three-dimensional detailed flying route based on the measurement results and the approximate flying route, to prepare a detailed flight plan including the detailed flying route and to control the flying vehicle so as to fly in maintaining a distance between the flying vehicle system and a surface of the object to be measured at a constant value based on the detailed flight plan and a result of the prism measurement.

Further, in the flying vehicle guiding system according to the present invention, the measuring device is a camera unit and the approximate flight plan includes photographing points and overlapping ratios as set on the approximate flying route.

Further, in the flying vehicle guiding system according to the present invention, the measuring device is a laser scanner and point cloud data are acquired by the laser scanner while the flying vehicle is flying along the detailed flying route.

Further, in the flying vehicle guiding system according to the present invention, in the detailed flying route, a portion not capable of being measured by the non-prism measurement of the position measuring instrument is deleted.

Further, in the flying vehicle guiding system according to the present invention, the position measuring instrument is configured to issue an alarm sound based on a detection of a separation of the flying vehicle system from the detailed flight route toward a side of the object to be measured.

Further, in the flying vehicle guiding system according to the present invention, the flying vehicle system has a GPS device and the control device is adapted to control a flight of the flying vehicle system either according to positional information of the flying vehicle system acquired by the position measuring instrument or according to positional information of the flying vehicle system acquired by the GPS device.

Further, in the flying vehicle guiding system according to the present invention, the flying vehicle system comprises the measuring device tiltably supported in an arbitrary direction via a gimbal mechanism and the retro-reflector integrally tilted with the measuring device in a known relation with the measuring device.

Further, a flight plan preparing method according to the present invention uses a flying vehicle system designed as remotely controllable, a control device for remotely controlling the flying vehicle system and a position measuring instrument capable of performing a non-prism measurement and a prism measurement, comprising: a step of setting a flight range within a flat plane based on a map information, a drawing, or an image including an object to be measured, a step of setting a two-dimensional approximate flying route within the flight range, a step of preparing an approximate flight plan including the approximate flying route, a step of measuring the approximate flying route by the non-prism measurement and a step of preparing a detailed flight plan including a three-dimensional detailed flying route as set based on a result of the non-prism measurement and on a setting of a distance between the object to be measured and the flying vehicle system.

Further, in the flight plan preparing method according to the present invention, the flying vehicle system has a camera unit as a measuring device, the approximate flight plan or the approximate flying route includes a photographing point as set on the approximate flying route and overlapping ratio between images adjacent to each other in images as acquired by the camera unit.

Furthermore, in the flight plan preparing method according to the present invention, in the detailed flying route, a portion where distance measurement data is not acquired in the result of the non-prism measurement, is deleted.

According to the present invention, the flying vehicle guiding system, which comprises a flying vehicle system having a measuring device installed and capable of remotely controlling, a position measuring instrument capable of measuring distance, angle and of tracking, a ground base station for controlling a flight of a flying vehicle based on measurement result of the position measuring instrument and a control device installed on the flying vehicle or on the ground base station, wherein the flying vehicle has a retro-reflector, the position measuring instrument has a non-prism measurement function for performing a distance measurement and an angle measurement in non-prism and a prism measurement function for performing the distance measurement and the angle measurement with respect to the retro-reflector, the control device is adapted to have a flight range as set within a flat plane according to map information, drawing or image including an object to be measured, to prepare an approximate flight plan having a two-dimensional approximate flying route as set within the flight range, to measure the approximate flying route by the non-prism measurement, to calculate a three-dimensional detailed flying route based on the measurement results and the approximate flying route, to prepare a detailed flight plan including the detailed flying route and to control the flying vehicle so as to fly in maintaining a distance between the flying vehicle system and a surface of the object to be measured at a constant value based on the detailed flight plan and a result of the prism measurement. As a result, it is possible to shorten the distance between the object to be measured and the flying vehicle system, and to measure the surface of the object to be measured from a close-in distance where a micro crack can be detected.

Further, according to the present invention, the flight plan preparing method, which uses a flying vehicle system designed as remotely controllable, a control device for remotely controlling the flying vehicle system and a position measuring instrument capable of performing a non-prism measurement and a prism measurement, comprising a step of setting a flight range within a flat plane based on a map information, a drawing, or an image including an object to be measured, a step of setting a two-dimensional approximate flying route within the flight range, a step of preparing an approximate flight plan including the approximate flying route, a step of measuring the approximate flying route by the non-prism measurement and a step of preparing a detailed flight plan including a three-dimensional detailed flying route as set based on a result of the non-prism measurement and on a setting of a distance between the object to be measured and the flying vehicle system. As a result, it is possible to shorten the distance between the object to be measured and the flying vehicle system, and to measure the surface of the object to be measured from a close-in distance where a micro crack can be detected.

BRIEF DESCRIPTION OF THE DRAWINGS

FIG. 7 is a flowchart to explain a preparation processing of a detailed flight plan in the present embodiment.

DETAILED DESCRIPTION OF THE PREFERRED EMBODIMENT

A description will be given below on an embodiment of the present invention by referring to the attached drawings.

Figure 1:
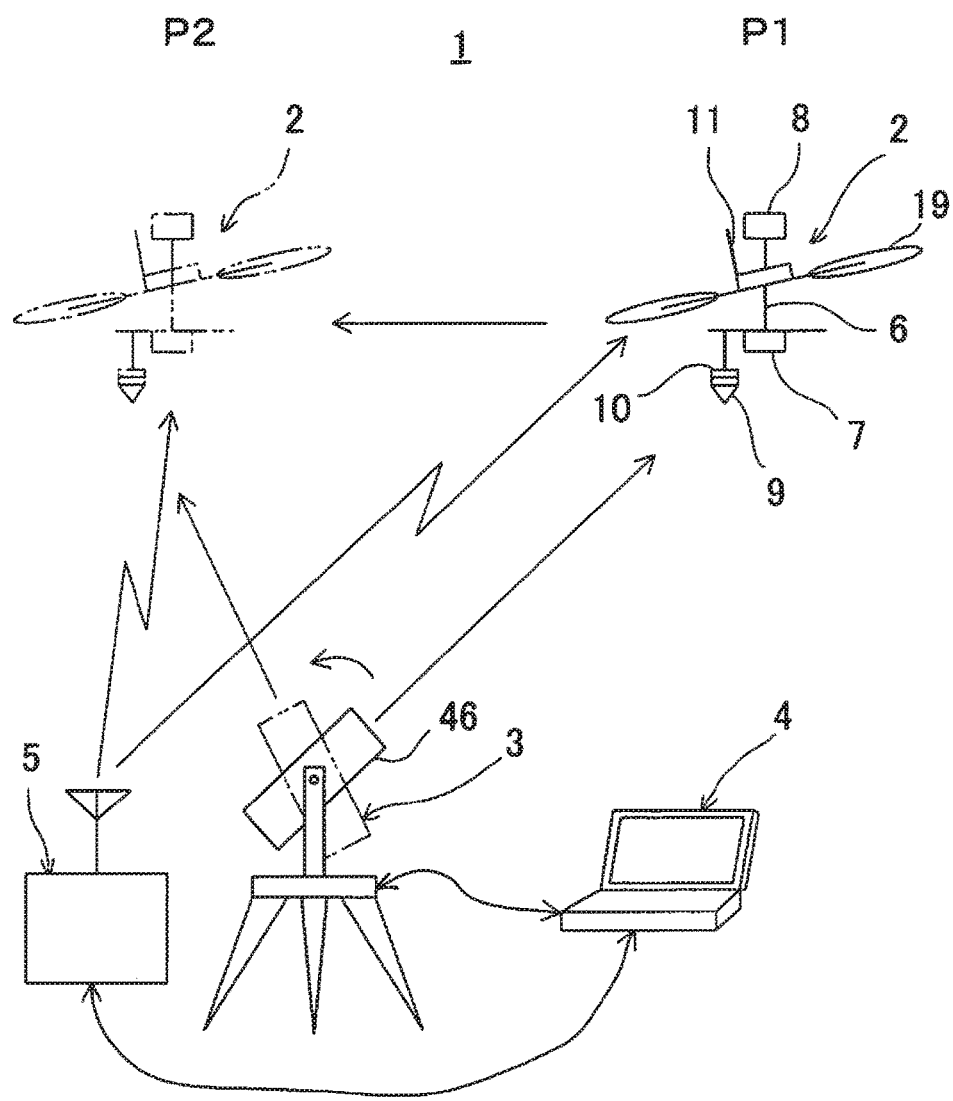
FIG. 1 is a block diagram to show a flying vehicle guiding system according to a present embodiment.

First, referring to FIG. 1, a description will be given on a flying vehicle guiding system according to the present embodiment.

A flying vehicle guiding system 1 primarily comprises a flying vehicle system (UAV) 2, a position measuring instrument 3, a ground base station 4, and a remote controller 5. FIG. 1 shows a case where a total station (TS) is used as the position measuring instrument 3.

The flying vehicle system 2 primarily comprises a flying vehicle 15 (to be described later), a shaft 6 as a supporting member vertically supported on the flying vehicle 15 via a gimbal mechanism, a camera 7 disposed at a lower end of the shaft 6, a GPS device 8 disposed at an upper end of the shaft 6, a prism 9 as a retro-reflector disposed at the lower end of the shaft 6, a directional angle sensor 10 integrally mounted with the prism 9 and disposed in a known relation with an optical axis of the camera 7, and a flying vehicle communication unit 11 for performing communication to and from the ground base station 4. The camera 7 fulfills a function as a measuring device for photographing aerial photographs, or for photographing an object to be measured for performing photogrammetry.

Here, for the flying vehicle system 2, a reference position is set, and a relationship between the reference position and the camera 7, the GPS device 8 and the prism 9 is already known. As the reference position of the flying vehicle system 2, for instance, a central position or the like of an image pickup element (not shown) of the camera 7 is used.

The camera 7 is rotatably supported via a horizontal shaft (to be described later), and the optical axis of the camera 7 is arranged so as to rotate within a plane which runs in parallel to an axis of the shaft 6. Further, a rotation range of the camera 7 includes at least a range where the optical axis of the camera 7 is from a vertical position to a horizontal position.

The shaft 6 is supported by the gimbal mechanism in such a manner that the axis of the shaft 6 runs vertically. Therefore, in a case where the optical axis of the camera 7 is vertical, the optical axis of the camera 7 and the axis of the shaft 6 coincide with each other.

An optical axis of the prism 9 is also arranged so as to run in parallel with the axis of the shaft 6 and is set so as to run in a vertical direction. Further, a positional relation between the prism 9 and the camera 7 is also already known. It is to be noted that it would suffice if the optical axes of each of the camera 7 and the prism 9 are supported so as to run in the vertical direction, and the axis of the shaft 6 may not necessarily run in the vertical direction.

The prism 9 is provided in such a manner that the prism 9 directed in a downward direction, and the prism 9 has optical characteristics to retro-reflect a entering light from entire ranges below the prism 9. Further, instead of the prism 9, a reflection seal may be provided at a predetermined position of the shaft 6.

A position which the GPS device 8 measures is located on the axis of the shaft 6, and the position which the GPS device 8 measures is already known with respect to the camera 7.

Figure 2A:
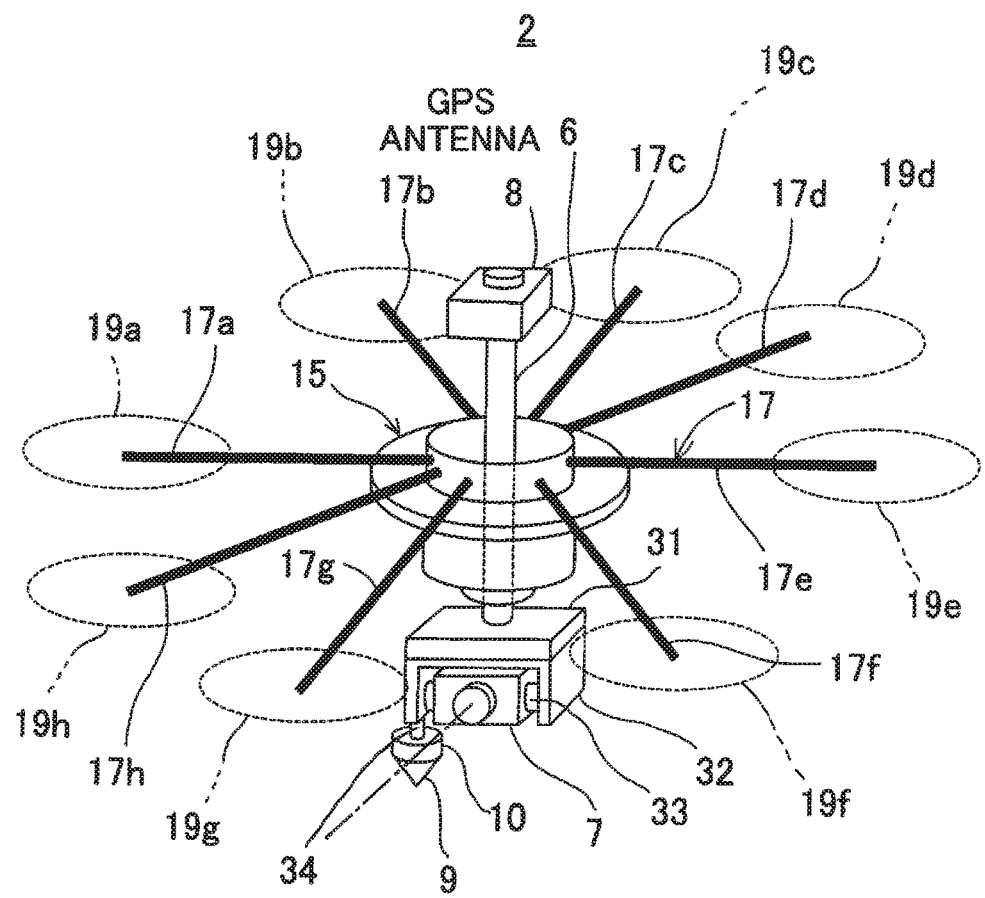
FIG. 2A is a perspective view to show a flying vehicle system according to the present embodiment.
Figure 2B:
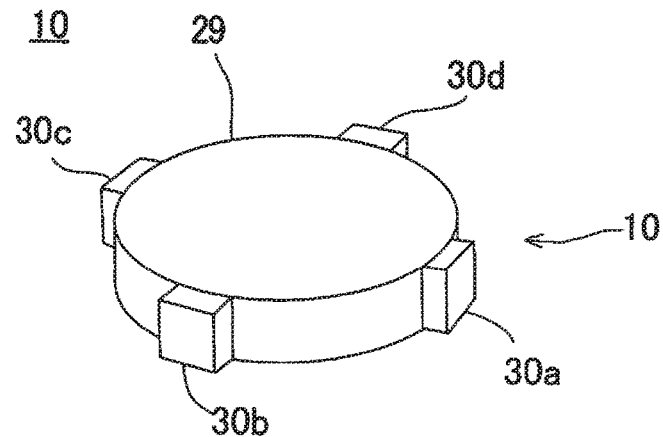
FIG. 2B is a perspective view to show one example of a directional angle sensor.

The directional angle sensor 10 detects a direction of the flying vehicle system 2. As the directional angle sensor 10, what is shown in FIG. 2B is provided, for instance.

A light receiving sensor 30 (in FIG. 2B, light receiving sensors 30a-30d) are provided at such positions as equally divided in a circumferential direction as required. Each of the light receiving sensors 30 is capable of receiving a distance measuring light or a tracking light issued from the position measuring instrument 3. By judging as to which of the light receiving sensors 30a-30d has detected the distance measuring light or the tracking light, the light receiving sensor 30 is adapted to detect a direction of the light receiving sensor 30 with respect to the distance measuring light or the tracking light (i.e. a direction of the flying vehicle system 2 with respect to the position measuring instrument 3).

The position measuring instrument 3 is installed at an arbitrary position, and a leveling is performed so that the position measuring instrument 3 is set in a horizontal position. The position measuring instrument 3 can perform a non-prism measurement (i.e. a measurement not using a prism and a retro-reflector) and a prism measurement (i.e. a measurement using a prism and a retro-reflector as an object to be measured), and also can perform measuring a horizontal angle and a vertical angle.

The non-prism measurement is capable of performing the non-prism measurement on a pre-scheduled range with reference to an installation position of the position measuring instrument 3.

Further, the position measuring instrument 3 has a tracking function. Under a condition where the prism measurement is performed, the position measuring instrument 3 measures three-dimensional coordinates (a slope distance, a horizontal angle and a vertical angle) of the prism 9, with respect to the installation position of the position measuring instrument 3 while tracking the prism 9 during a flight of the flying vehicle system 2. It is to be noted that in the present embodiment, a total station (TS) is used as the position measuring instrument 3, but it is not limited to the total station as long as a measuring instrument has the tracking function and is capable of measuring a slope distance, a horizontal angle and a vertical angle.

The position measuring instrument 3 is electrically connected to the ground base station 4 via wired or wireless means, and the measured three-dimensional coordinates of the prism 9 (i.e. the flying vehicle system 2) are inputted to the ground base station 4 as coordinate data.

The installation position (absolute coordinates) of the position measuring instrument 3 can be measured by a method as given below.

By the position measuring instrument 3, a position of the flying vehicle system 2 during the flight is measured. Further, by the GPS device 8, positional coordinates at two points of the flying vehicle system 2 are measured. Next, based on the results of measurement obtained by the position measuring instrument 3 and based on the positional coordinates (GPS coordinates) obtained by the GPS device 8, the installation position of the position measuring instrument 3 (GPS coordinates) is determined by a method of resection. Further, absolute coordinates can be obtained by a coordinate conversion of the GPS coordinates. Therefore, if the GPS coordinates are obtained, it becomes possible to obtain the absolute coordinates of the position measuring instrument 3. Further, it becomes possible to convert the results of the non-prism measurement with reference to the installation position of the position measuring instrument 3 to absolute coordinates.

Furthermore, the prism 9 (i.e. the flying vehicle system 2) is tracked by the position measuring instrument 3 and three-dimensional coordinates of the prism 9 as measured (i.e. the three-dimensional coordinates of the flying vehicle system 2) also can be converted to the GPS coordinates, and further to the absolute coordinates in a similar manner. Therefore, by transmitting the positional coordinates of the flying vehicle system 2 as measured by the position measuring instrument 3 in real time to the flying vehicle system 2 from the ground base station 4, it is possible to make the flying vehicle system 2 fly based on the positional coordinates measured by the position measuring instrument 3. It is to be noted that in the description as given below, the result in which the measurement result of the position measuring instrument 3 is converted to a GPS coordinate system is also referred as GPS coordinates.

It is to be noted it may be so arranged that the position measuring instrument 3 is installed at a known point, and a process to measure the installation position of the position measuring instrument 3 by the method of resection may be omitted.

The ground base station 4 is a PC, for instance, and has an arithmetic device with a calculating function, a storage unit for storing data and programs, and further, a base communication unit. The base communication unit is capable of communicating to and from the position measuring instrument 3 and the remote controller 5, and the remote controller 5 is capable of performing wireless communication to and from the flying vehicle communication unit 11.

The flying vehicle system 2 has a control device as to be described later. Therefore, by setting flight plan data which include data such as a flying route of the flying vehicle 15 and a photographing distance with respect to the object to be measured or the like, it is possible to make the flying vehicle system 2 fly autonomously based on positional data from the position measuring instrument 3 or on positional data as determined by the GPS device 8.

The remote controller 5 is arranged in such a manner that the remote controller 5 can remotely control the flight of the flying vehicle system 2 in case of a manual operation. In a case where the manual operation is performed, the ground base station 4 sets a flight plan based on the results of the non-prism measurement and transmits flight control data relating to a flight range and a flying route to the remote controller 5 so that the flying vehicle system 2 can be remotely controlled according to the flight plan. When the flight control data relating to the flight range is transmitted from the ground base station 4, a flight control signal to be transmitted from the remote controller 5 is limited by the flight control data, and the flying vehicle system 2 is controlled in such a manner that the flying vehicle system 2 flies within the flight range. Further, the remote controller 5 is capable of remotely controlling the camera 7 and a shutter of the camera 7.

Figure 3:
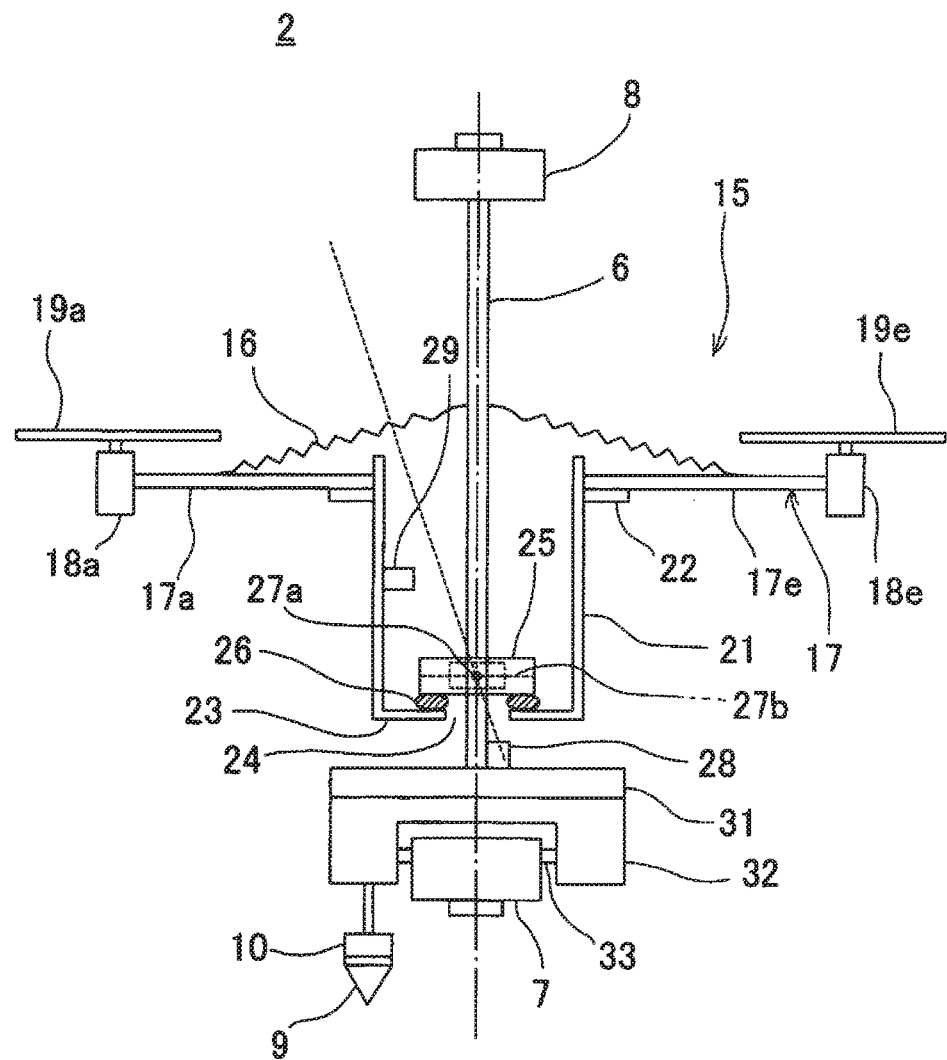
FIG. 3 is a cross-sectional view to show the flying vehicle system.

Next, by referring to FIG. 2A, FIG. 2B, and FIG. 3, a description will be given on the flying vehicle system 2.

The flying vehicle 15 has a plurality of and even-numbered propeller frames 17 extending in a radial direction, and a propeller unit is provided at a forward end of each of the propeller frames 17. The propeller unit comprises propeller motors 18 (propeller motors 18a and 18e as given in FIG. 3) mounted on the forward end of the propeller frame 17, and propellers 19 (in the figure, propellers 19a-19h) as mounted on an output shaft of the propeller motor 18. It is so arranged that the propellers 19 are rotated by the propeller motors 18 and the flying vehicle 15 flies.

The flying vehicle 15 has a main frame 21 in a hollow cylindrical shape at its center. An outer flange 22 extending in an outward direction is provided on an upper end of the main frame 21, and an inner flange 23 extending toward the center is provided on a lower end of the main frame 21. At a central portion of the inner flange 23, a hole 24 in a circular shape is formed.

Each of the propeller frames 17 is designed in a rod-like shape and is arranged within a plane, which perpendicularly crosses an axis of the main frame 21, and is provided by a predetermined number (at least 4, and, more preferably 8; in the FIG. 8 (propeller frames 17a-17h)) in a horizontal direction with an equal angular interval. An inner end of the propeller frame 17 passes through the main frame 21 and is fixed on the outer flange 22.

The shaft 6 is provided so as to pass through the main frame 21 in an up-and-down direction, and the shaft 6 is supported by a gimbal 25 so as to run in a vertical direction. The gimbal 25 is provided on the inner flange 23 via a vibration-proof member 26.

The gimbal 25 has swing shafts 27a and 27b, which perpendicularly cross each other in two directions, and the gimbal 25 movably supports the shaft 6 in perpendicular two directions. The vibration-proof member 26 absorbs a vibration when the propeller motor 18 and the propeller 19 are rotated, and the vibration-proof member 26 is so arranged that the vibration is not transmitted to the shaft 6.

A tilt sensor 28 is provided at a lower end of the shaft 6, and detects a tilting of the shaft 6 caused by a change of a flying condition of the flying vehicle 15. Further, the tilt sensor 28 detects an angle between a vertical line and the axis of the shaft 6 in a case where the shaft 6 is tilted with respect to the vertical line. A detection result of the tilt sensor 28 is transmitted to a control device 35 (see FIG. 4) which is to be described later.

The directional angle sensor 10 detects a direction of the flying vehicle 15. The direction of the flying vehicle 15 is, for instance, a direction of the flying vehicle 15 with reference to a position where the position measuring instrument 3 is installed. It is to be noted that, in the present embodiment, a directional angle sensor as shown in FIG. 2B is used as the directional angle sensor 10. Further, an azimuth sensor may be used as the directional angle sensor 10.

The present embodiment shows a case where the directional angle sensor 10 is provided integrally with the prism 9. On a lower surface of a camera holder 32 (to be described later), the directional angle sensor 10 is provided via a supporting member 34. Further, on a lower surface of the directional angle sensor 10, the prism 9 is provided. By referring to FIG. 2B, a brief description will be given below on the directional angle sensor 10.

Along an outer peripheral surface of a sensor case 29 formed in a cylindrical shape, light receiving sensors 30a, 30b, 30c and 30d are arranged. The light receiving sensors 30a, 30b, 30c and 30d are disposed at positions divided to four equal parts by dividing a circumferential periphery, and each of the light receiving sensors 30a, 30b, 30c and 30d is arranged in such a manner that a light receiving signal is issued when receiving the distance measuring light or the tracking light emitted from the position measuring instrument 3. Further, by judging as to which position of the light receiving sensors 30a, 30b, 30c and 30d receives the distance measuring light or the tracking light, the direction of the flying vehicle system 2 with respect to the position measuring instrument 3 is detected.

A control box 31 is provided on the lower end of the shaft 6. Inside the control box 31, the control device 35 and an IMU (Inertial Measurement Unit) 40 (to be described later) are accommodated. On a lower surface of the control box 31, the camera holder 32 is provided, and the camera 7 is provided on the camera holder 32 via a horizontal shaft 33. The camera 7 is rotatable with the horizontal shaft 33 as the center, and an image pickup direction changing motor (not shown) for rotating the camera 7 via the horizontal shaft 33 is provided on the camera holder 32. A standard posture of the camera 7 is with an optical axis in a vertical direction, and the image pickup direction changing motor rotates the camera 7 at an angle as required with respect to the vertical direction according to a command from the control device 35. In FIG. 2A, the optical axis of the camera 7 is set to run in a horizontal direction and, in FIG. 3, the optical axis of the camera 7 is set to run in a vertical direction in order to facilitate the explanation.

A digital camera is used as the camera 7, and a still image (static image) can be photographed, and a video image can also be taken. Further, a CCD, a CMOS sensor, etc., each of which is an aggregate of pixels, is used as an image pickup element, and a position of each pixel can be specified in the image pickup element. For instance, the position of each pixel can be specified by orthogonal coordinates, which have a point on the image pickup element as an origin point where an optical axis of a camera passes through.

On the upper end of the shaft 6, the GPS device 8 is provided. The center of the GPS device 8 (a reference position of the GPS device 8) coincides with the axis of the shaft 6, and the optical axis of the prism 9 runs in parallel to the axis of the shaft 6.

The control box 31, the camera holder 32, the camera 7 and the prism 9, etc. fulfill a function as a balance weight. Under a condition where no external force is applied on the shaft 6, i.e. under a free condition, a weight balance of the control box 31, the camera holder 32, the camera 7 and the prism 9, etc. is set so that the shaft 6 is maintained in a vertical condition.

For the purpose of maintaining a posture of the shaft 6 in a stable manner and in the vertical condition, in a case where the shaft 6 is tilted rapidly (in a case where a posture of the flying vehicle 15 is changed rapidly), a balance auxiliary member may be provided in order that the vertical condition can be restored quickly. It is to be noted that in a case where the shaft 6 can be sufficiently maintained in the vertical condition by a balance weight function of the control box 31, the camera holder 32, the camera 7 and the prism 9, etc., it is not necessary to provide the balance auxiliary member.

In examples as given below, a description will be given on a case where a damper spring 16 is provided as the balance auxiliary member.

Between the propeller frame 17 and the shaft 6, the damper spring 16 is provided. At least three, or more preferably four damper springs 16 are provided. It is preferable that the damper springs 16 are provided between the propeller frames 17 extending in parallel to the swing shafts 27a and 27b, and the shaft 6.

Further, the four damper springs 16 apply tensile forces between the shaft 6 and the propeller frames 17 respectively and in a condition where the flying vehicle 15 is in a horizontal posture (in a condition where the propeller frame 17 is in a horizontal position), the four damper springs 16 are set so that the shaft 6 is maintained by the balancing of the tensile force. Further, the tensile force and a spring constant of the damper spring 16 are set to smaller values, and the shaft 6 is directed in the vertical direction due to an action of a gravity when the flying vehicle 15 is tilted.

The damper spring 16 is a biasing means for biasing the shaft 6 in the vertical condition, and in a case where the shaft 6 is swung or vibrated, the damper spring 16 promptly returns the shaft 6 to the vertical condition and makes a vibration attenuate. Further, as the biasing means, in addition to the damper spring 16, a torsion coil spring may be used to rotate in a returning direction when the swing shafts 27a and 27b of the gimbal 25 are rotated.

Figure 4:
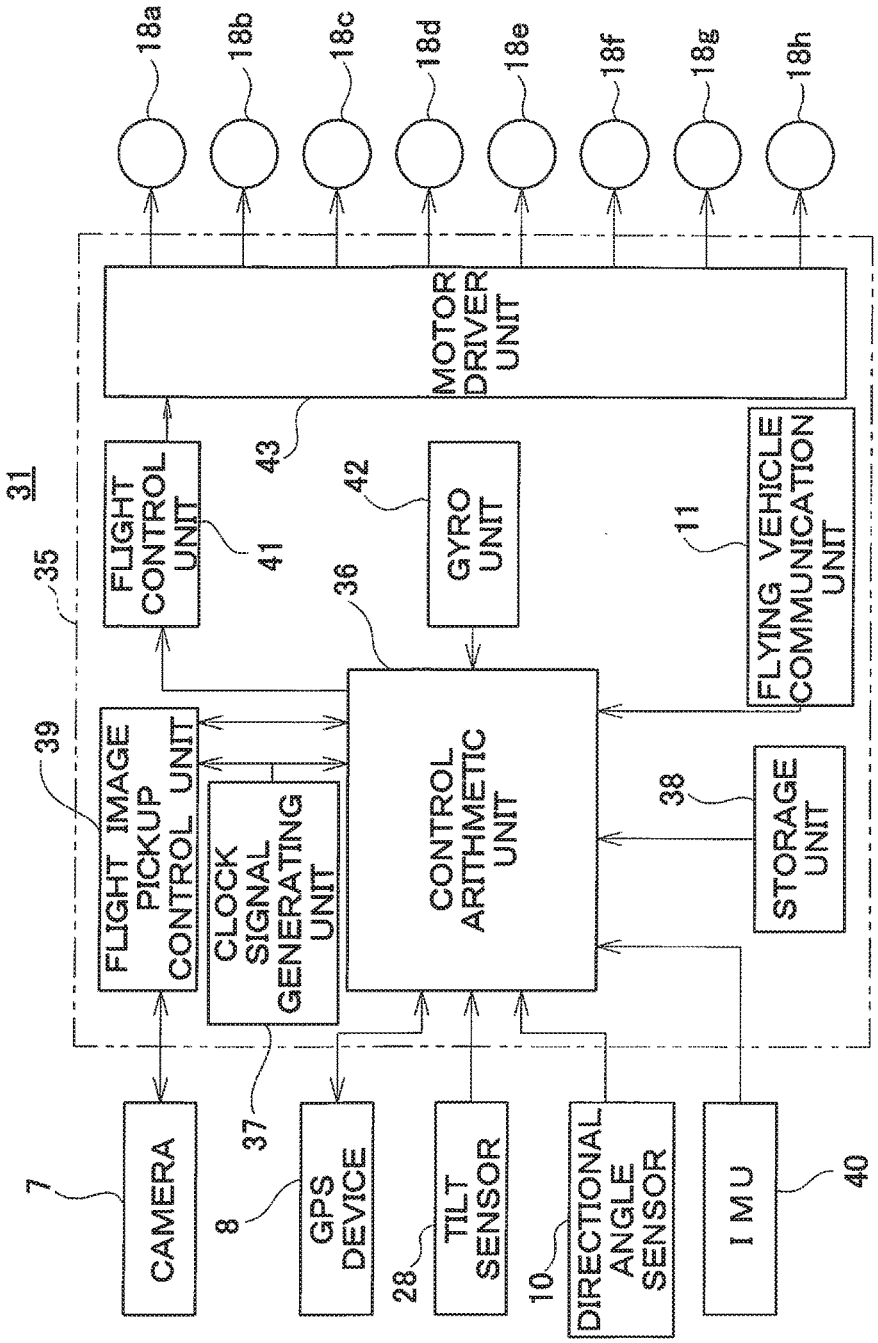
FIG. 4 is a block diagram to show a control system of the flying vehicle system.

By referring to FIG. 4, a description will be given below on a control system of the flying vehicle system 2.

The control device 35 and the IMU 40 are accommodated inside the control box 31.

The control device 35 primarily comprises a control arithmetic unit 36, a clock signal generating unit 37, a storage unit 38, a flight image pickup control unit 39, a flight control unit 41, a gyro unit 42, a motor driver unit 43, and the flying vehicle communication unit 11.

A photographing by the camera 7 is controlled by the flight image pickup control unit 39, and the image taken by the camera 7 is inputted to the flight image pickup control unit 39 as image data.

In the storage unit 38, a program storage area and a data storage area are formed. Various types of programs are stored in the program storage area. These programs include: a photographing program for controlling a photographing of the camera 7, a flight control program for controlling a driving of the propeller motor 18 and for controlling a flight based on a flight control signal to be described later, a flying vehicle system position calculating program for calculating the position of the flying vehicle system 2 in real time based on a detection result by the IMU 40, a restoration program for restoring the flying vehicle 15 to a predetermined position based on a calculated position, a communication program for transmitting data as acquired to the ground base station 4 and for receiving a flight command or the like from the remote controller 5, a data processing program for processing and storing data acquired by the camera 7, an image tracking program for tracking by using video image data acquired by the camera 7, a flight plan preparing program for preparing a flight plan, and other programs.

In the data storage area, various types of data are stored. These data include: flight plan data for executing an autonomous flight, still image data and video image data acquired by the camera 7, positional data of the flying vehicle system 2 determined by the GPS device 8 during the flight, positional data of the flying vehicle system 2 as measured by the position measuring instrument 3 and as transmitted from the remote controller 5, moving distance data as measured by the IMU 40, positional data of the flying vehicle system 2, and further, time and positional data when the still image data and the video image data are acquired, and other data.

The flight image pickup control unit 39 controls regarding an image pickup of the camera 7 based on the control signal issued from the control arithmetic unit 36. The modes of the control are: a selecting of a camera angle suitable for the object to be measured, a controlling of the image pickup of the camera 7, and a controlling to acquire a still image at a predetermined time interval during acquiring a video image, etc. Further, with respect to the camera 7, an image pickup moment is controlled or synchronously controlled based on a clock signal issued from the clock signal generating unit 37.

The directional angle sensor 10 detects a direction of the flying vehicle 15, and inputs a detection result to the control arithmetic unit 36. The gyro unit 42 detects a posture of the flying vehicle 15 under the flight condition, and inputs a detection result to the control arithmetic unit 36.

The flying vehicle communication unit 11 receives a flight control signal from the remote controller 5 when the flight of the flying vehicle 15 is remotely controlled by the remote controller 5, and inputs the flight control signal to the control arithmetic unit 36. Or, the flying vehicle communication unit 11 has such a function that image data photographed by the camera 7 are transmitted to the ground base station 4 on the ground side together with a time when the image was taken.

The control arithmetic unit 36 converts the positional coordinates as measured by the position measuring instrument 3 to GPS coordinates and obtains as GPS coordinates of the flying vehicle system 2. Further, the control arithmetic unit 36 obtains the GPS coordinates of the flying vehicle system 2 as determined by the GPS device 8. The control arithmetic unit 36 calculates the flight control signal based on the GPS coordinates thus obtained and on the flight command as transmitted from the remote controller 5, or calculates the flight control signal based on the flight plan data stored in the storage unit 38 and on the GPS coordinates and outputs the flight control signal to the flight control unit 41.

As to using which of the GPS coordinates obtained based on the measurement results of the position measuring instrument 3 or the GPS coordinates determined by the GPS device 8, the GPS coordinates which could be obtained are used as a general rule. For instance, in a case where an obstacle exists between the flying vehicle system 2 and the position measuring instrument 3, and the tracking of the flying vehicle system 2 cannot be performed by the position measuring instrument 3, there is no more positional data from the position measuring instrument 3. As a result, the GPS coordinates as determined by the GPS device 8 are used. Further, the positional data as measured by the IMU 40 is updated in real time or at the time interval as predetermined based on the positional data acquired by the GPS device 8 or by the position measuring instrument 3.

Further, under an environmental condition such as a case where radio waves from an artificial satellite are interrupted due to a building or the like, the GPS coordinates obtained based on the measurement result of the positioning measuring instrument 3 are used. It is to be noted that the absolute coordinates obtained from the GPS coordinates may be used as a positional information to make the flying vehicle system 2 fly.

Further, there may be a case where the flying vehicle system 2 is located at a position such as under a bridge where radio waves from the artificial satellites are interrupted and an obstacle exists between the flying vehicle system 2 and the position measuring instrument 3, i.e. a case where the GPS coordinates cannot be obtained by neither the position measuring instrument 3 nor the GPS device 8. In such case, the IMU 40 measures a moving distance and a moving direction (i.e. a present position of the flying vehicle system 2) from a position where an obtaining of the GPS coordinates has been interrupted, for instance, from the position where the position measuring instrument 3 cannot track the flying vehicle system 2. Based on the measurement result, the control arithmetic unit 36 outputs the flight control signal for restoring the flying vehicle system 2 to a position where the GPS coordinates can be obtained. Here, a positional information of the flying vehicle system 2 until restoring is obtained by the IMU 40.

It is to be noted that in a case where both of the measurement results, i.e. the measurement result by the position measuring instrument 3 and the measurement result by the GPS device 8 can be obtained, the order of priority for using the results may be determined in advance. Since the position measuring instrument 3 has a better measurement accuracy, in a case where the priority is given to the accuracy, it is preferable to put the priority on the measurement results by the position measuring instrument 3.

Further, the control arithmetic unit 36 executes the control necessary for acquiring an image according to the program as required, which is stored in the storage unit 38.

When the flight control signal is inputted from the control arithmetic unit 36, the flight control unit 41 drives the propeller motors 18a-18h to a condition as required via the motor driver unit 43 based on the flight control signal.

Figure 5:
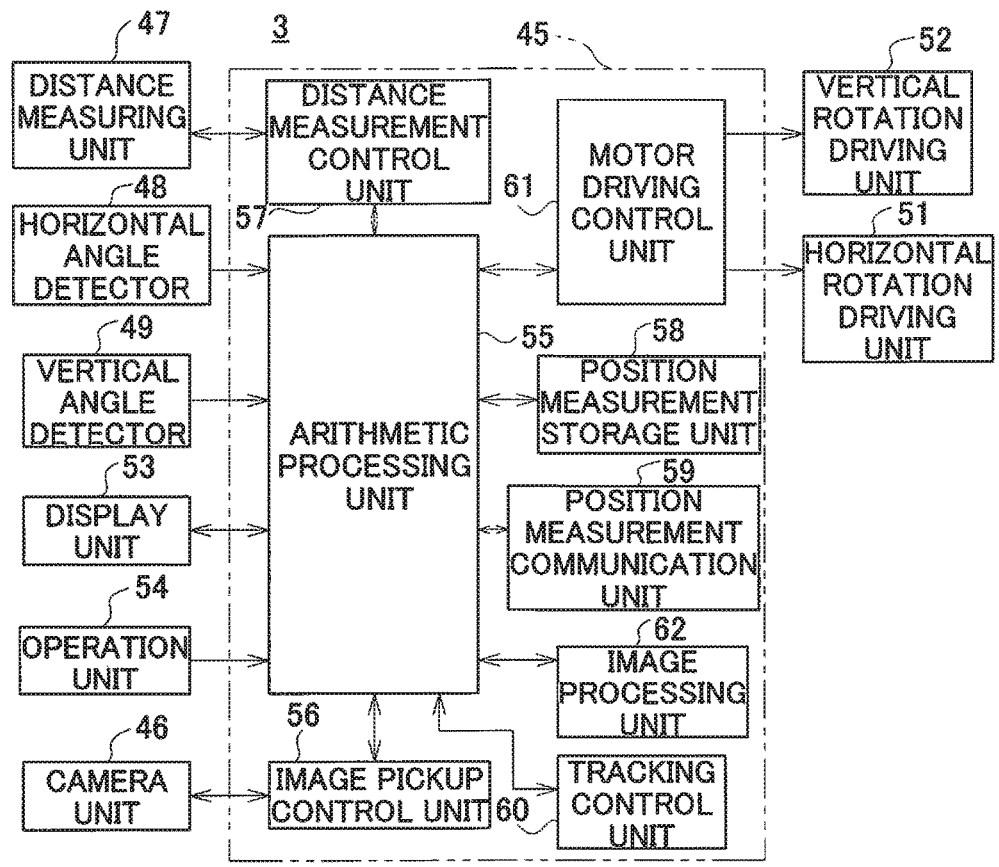
FIG. 5 is a schematical block diagram to show one example of a position measuring instrument according to the present embodiment.

Next, by referring to FIG. 5, a description will be given on the position measuring instrument 3.

The position measuring instrument 3 primarily comprises a measurement control unit 45, a camera unit 46 (see FIG. 1), a distance measuring unit 47, a horizontal angle detector 48, a vertical angle detector 49, a horizontal rotation driving unit 51, a vertical rotation driving unit 52, a display unit 53, an operation unit 54, etc.

As the camera unit 46, a digital camera is used, and still images can be taken and video images can also be taken. Further, a CCD, a CMOS sensor, etc., each of which is an aggregate of pixels, is used as an image pickup element, and a position of each pixel can be specified in the image pickup element. Further, the camera unit 46 is a camera, which is capable of zooming in by an optical processing or by a digital processing, or by both an optical processing and a digital processing. It is so arranged that the object to be measured is detected from the video images or the still images as taken by the camera unit 46, and the object to be measured is sighted (image tracked).

The distance measuring unit 47 emits a distance measuring light via the camera unit 46, and further, receives the reflected light from the object to be measured via the camera unit 46, and measures a distance. Further, the distance measuring unit 47 has three modes as a measurement mode, i.e. a non-prism measurement mode, a prism measurement mode and a tracking measurement mode for tracking the object to be measured (prism) while performing the prism measurement, and it is possible to measure the distance to the object to be measured by one of these three modes. It is to be noted that in the tracking measuring mode, a tracking light is projected via the camera unit 46 in addition to the distance measuring light.

The horizontal angle detector 48 detects a horizontal angle in a sighting direction of the camera unit 46. Further, the vertical angle detector 49 detects a vertical angle in the sighting direction of the camera unit 46. The detection results of the horizontal angle detector 48 and the vertical angle detector 49 are inputted to the measurement control unit 45.

The display unit 53 is a touch panel, for instance, and it is possible to adjust a sighting position by sliding a finger in touched condition. Further, the operation unit 54 is adapted to perform various types of operations such as a change of the measurement mode, a setting a measuring condition, a fine adjustment of a sighting position, etc. Further, the display unit 53 can also fulfill a function of the operation unit 54.

The measurement control device 45 primarily comprises an arithmetic processing unit 55, an image pickup control unit 56, a distance measuring control unit 57, a position measurement storage unit 58, a position measurement communication unit 59, a tracking control unit 60, a motor driving control unit 61, an image processing unit 62, and the like.

The image pickup control unit 56 sets a magnification of the camera unit 46 and a timing of photographing, etc., according to a command from the arithmetic processing unit 55. Further, the image pickup control unit 56 controls the camera unit 46 according to the magnification and the timing of photographing, and the like as set.

The distance measurement control unit 57 decides that the measurement should be executed in which of the modes, the non-prism measurement mode, the prism measurement mode or the tracking light measurement mode based on a measurement selecting command from the arithmetic processing unit 55. Further, the distance measurement control unit 57 controls a measurement by the distance measuring unit 47 according to the measurement mode as determined. Here, in the non-prism measurement mode, the position measuring instrument 3 performs measuring regarding structures such as a bridge, a dam, etc. as the object to be measured. In the tracking measurement mode, the object to be measured acts as the prism 9, and the position of the flying vehicle system 2 is measured while tracking the flying vehicle system 2.

In the position measurement storage unit 58, various types of programs are stored. These programs include: a measurement program for performing a distance measurement by each of the measurement modes such as the non-prism measurement mode, the prism measurement mode, and the tracking measurement mode, a tracking program for carrying out the tracking by receiving the tracking light, an image tracking program for performing a tracking by an image processing, a communication program for performing communication to and from the flying vehicle system 2 and the ground base station 4, and other programs. Further, in the position measurement storage unit 58, measurement results of the object to be measured (a distance measurement and an angle measurement), and the images acquired by the camera unit 46 are stored.

The position measurement communication unit 59 transmits the measurement results (a slope distance, a vertical angle and a horizontal angle of the prism 9) of the object to be measured (the prism 9) in the tracking measurement mode to the ground base station 4 in real time. The prism tracking and the image tracking for detecting the object to be measured from a picked-up image and for tracking, are performed at the same time, and the prism tracking is carried out with priority.

The tracking control unit 60 calculates a difference between a center of the image pickup element and a light receiving position with respect to the prism 9, based on the light receiving position on the image pickup element when the tracking light as reflected by the prism 9 is received. Further, the tracking control unit 60 transmits a control signal to the motor driving control unit 61 based on the calculation results so that a deviation between the center of the image pickup element and the light receiving position with respect to the prism 9 will be zero.

The motor driving control unit 61 controls the horizontal rotation driving unit 51 and the vertical rotation driving unit 52, and rotates the camera unit 46 in a vertical direction or in a horizontal direction, in order to make the camera unit 46 sight the object to be measured. Or, the motor driving control unit 61 controls the horizontal rotation driving unit 51 and the vertical rotation driving unit 52, and rotates the camera unit 46 in the vertical direction or in the horizontal direction, in order to make the camera unit 46 track the object to be measured based on the control signal from the tracking control unit 60.

Further, the image processing unit 62 performs an image processing as necessary such as extracting feature points and edges from the image acquired by the camera unit 46. By the image processing, the object to be measured is detected from the image. The arithmetic processing unit 55 calculates a directional angle of the object to be measured, based on the position of the object to be measured in the image pickup element and based on detection results of the horizontal angle detector 48 and the vertical angle detector 49. In a case where the image tracking is carried out, the direction angle thus calculated is used.

Figure 6:
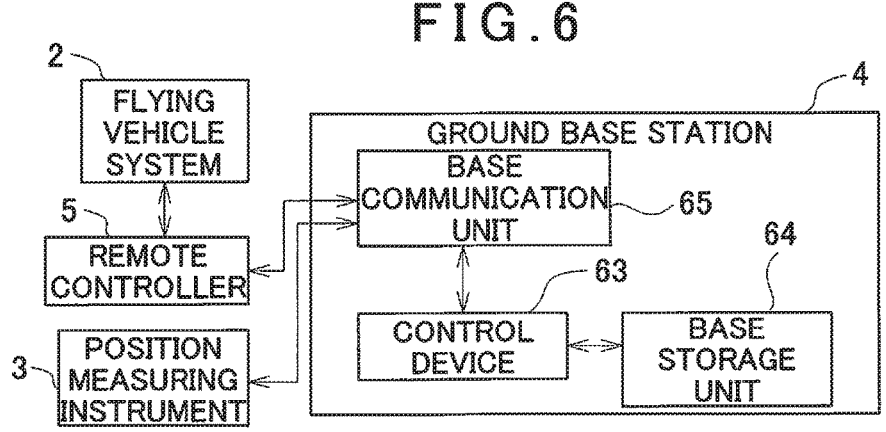
FIG. 6 is a drawing to show an approximate arrangement of a ground base station according to the present embodiment, and to show a relation between the flying vehicle system, the position measuring instrument, the ground base station, and a remote controller.

FIG. 6 is a drawing to show an approximate arrangement of the ground base station 4, and the relation between the flying vehicle system 2, the position measuring instrument 3, the ground base station 4, and the remote controller 5.

The ground base station 4 comprises a control device 63 having a calculating function, a base storage unit 64, and further, a base communication unit 65.

The control device 63 has a clock signal generating unit (not shown). The control device 63 associates image data, shutter time data and coordinates data as received via the remote controller 5 with a clock signal respectively. Further, the control device 63 processes these data as time series data based on the clock signal and stores in the base storage unit 64. Further, the control device 63 prepares an approximate flight plan (to be described later) and prepares a detailed flight plan data (to be described later) based on the approximate flight plan data.

In the base storage unit 64, various types of programs are stored. These programs include: an approximate flight plan preparing program for setting up a flight range and a flight route and the like based on a map information obtained via the Internet or on the images acquired by the camera unit 46, and for preparing the approximate flight plan, a detailed flight plan preparing program for amending the approximate flight plan based on measurement results of the flight range as obtained by the position measuring instrument 3, and for preparing the detailed flight plan, a flight control program for preparing flight control data for controlling the flight of the flying vehicle system 2 according to the detailed flight plan, a communication program for performing data communication to and from the remote controller 5 and the position measuring instrument 3, a program for calculating the GPS coordinates of the installation position of the position measuring instrument 3 based on the GPS coordinates of the flying vehicle system 2 at two positions or more as transmitted from the flying vehicle system 2, a program for converting the measurement results of the position measuring instrument 3 (the slope distance, the vertical angle, and the horizontal angle of the prism 9) to the GPS coordinates based on the GPS coordinates of the installation position of the position measuring instrument 3, and other programs.

It is to be noted that regarding the operation to convert the measurement results of the position measuring instrument 3 to the GPS coordinates based on the GPS coordinates of the installation position of the position measuring instrument 3, it may be so arranged that the measurement results of the position measuring instrument 3 are transmitted to the flying vehicle system 2 without converting, and the operation may be carried out by the control device 35 of the flying vehicle system 2.

Further, various data such as images acquired by the flying vehicle system 2, measurement data as measured by the position measuring instrument 3 (coordinate data), a time when the images are acquired, positional coordinates, the detailed flight plan data, and the like are stored in the base storage unit 64.

The base communication unit 65 performs wired communication or wireless communication to and from the ground base station 4 and the remote controller 5.

The detailed flight plan data is transmitted to the flying vehicle system 2 via the remote controller 5 or the base communication unit 65, and the detailed flight plan data is stored in the storage unit 38. The flight control unit 41 makes the flying vehicle system 2 fly autonomously based on the detailed flight plan data. Or, the detailed flight plan data is stored in the base storage unit 64 of the ground base station 4, and by transmitting a flight control signal as prepared to the flying vehicle system 2 based on the detailed flight plan data, it may be so arranged that the flying vehicle system 2 executes an autonomous flight.

In a case where an inspecting operation of structures such as bridges, dams, etc. is performed, for instance, it is necessary to detect micro cracks of 0.2 mm or so. Therefore, in order to detect the cracks from the images as photographed by the flying vehicle system 2, it is necessary to make the flying vehicle system 2 fly under a condition of approaching the object to be measured, and to acquire an image by setting a photographing distance (offset) to about 2 to 10 meters.

First, a measurement range is set according to an existing map information, a photograph, a design drawing, etc., and a flight route is set on a map. Further, in the setting of the flight route, for instance, in a case where an aerial photograph is photographed, overlapping ratio, photographing points, and the like are taken into consideration. As described above, a flight plan (the approximate flight plan) including a flying condition, a photographing condition, etc. is prepared. The approximate flight plan is two-dimensional flight plan data based on a two-dimensional information such as a map and the like, and does not correspond to a surface irregularities, a tilting or a curving of the surface of the object to be measured. Therefore, in a case where the flying vehicle system 2 is operated to fly autonomously, there may be a possibility that the cracks cannot be detected because the distance of photographing is varied. Further, in a case where the flying vehicle system 2 is operated to fly under the condition that the flying vehicle system 2 flies near the object to be measured, there may be a possibility that the flying vehicle system 2 comes into contact with the object to be measured.

For the purpose of making the flying vehicle system 2 fly while adequately maintaining the photographing distance between the flying vehicle system 2 and the object to be measured, it is necessary to prepare a three-dimensional flight plan (the detailed flight plan) which corresponds to the surface irregularities of the surface of the object to be measured.

By referring to a flowchart of FIG. 7, and to FIG. 8A, FIG. 8B, and FIG. 9, a description will be given on a preparation processing of the detailed flight plan for the purpose of carrying out a flight of the flying vehicle system 2 under the condition of approaching to the object to be measured. It is to be noted that the detailed flight plan is prepared in advance of the inspecting operation of structures such as bridges, dams, etc.

(Step 01) First, structures such as bridges, dams, etc. are regarded as objects to be measured, and measuring points necessary for setting a measurement range 68 are determined according to drawings or photographs. As shown in FIG. 8A, the measuring points are corner points 67 or the like of the object to be measured 66 (in the figure, an upper portion of a bridge pier) and it is set in such a manner that a closed space is formed by the measuring point.

The position measuring instrument 3 is installed at a predetermined point, for instance, at a known point with respect to the object to be measured 66. The measuring point as determined by the position measuring instrument 3 is measured in the non-prism measurement mode. The measurement range 68 is set based on the measurement results, photographs and map information already known. A flight range for making the flying vehicle system 2 fly is set. The flight range is set so as to sufficiently cover the measurement range 68 and preferably, the flight range is set larger than the measurement range 68.

Figure 8A:
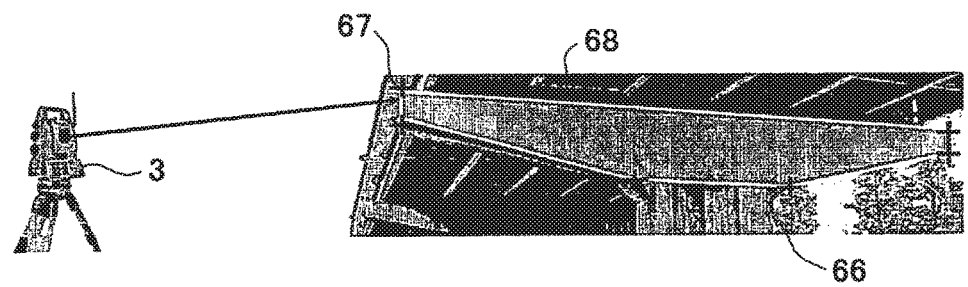
FIG. 8A is an explanatory diagram to explain a setting of a flight range in the present embodiment.
Figure 8B:
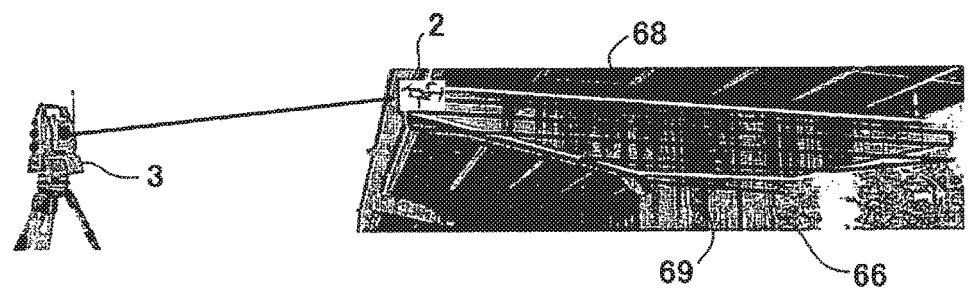
FIG. 8B is an explanatory diagram to explain a setting of an approximate flying route in the present embodiment.
Figure 9:
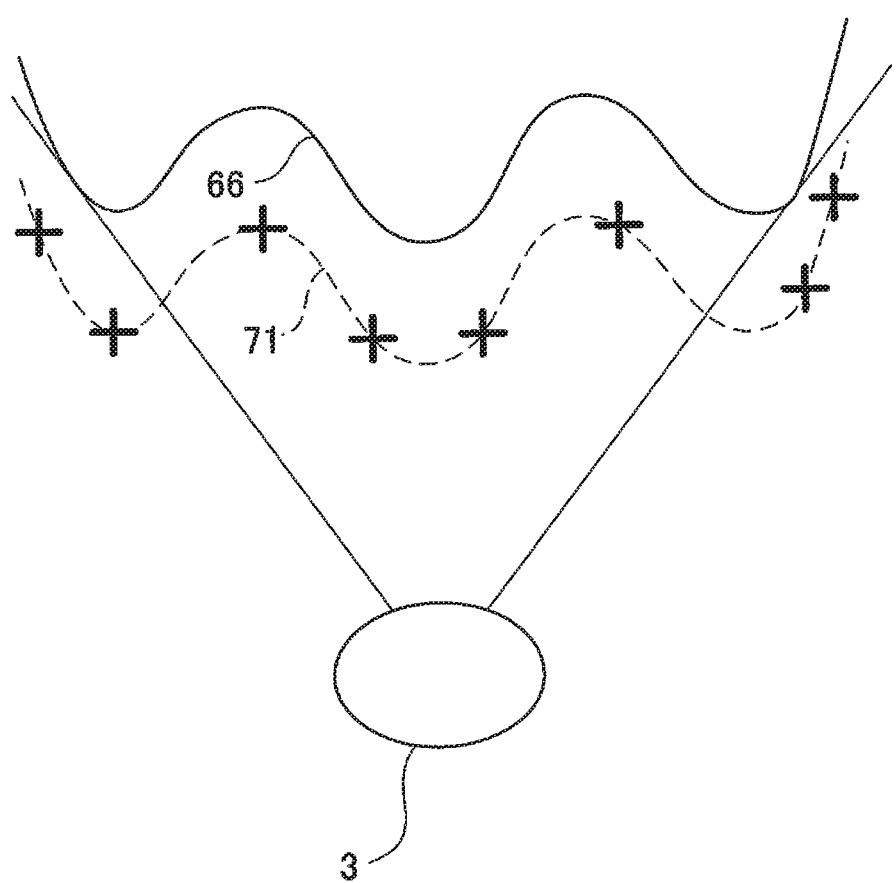
FIG. 9 is an explanatory diagram to explain a detailed flying route in the present embodiment.

In the present embodiment, the upper portion of the bridge pier is regarded as the object to be measured 66 as shown in FIG. 8A. Therefore, it may be arranged in such a manner that the corner points 67 of the object to be measured 66 is detected from a photograph taken by the camera unit 46 and a part surrounded by the corner points 67 may be set as the measurement range 68. Further, FIG. 8A shows a case where the measurement range 68 and the flight range are set to be equal to each other.

(Step 02) Next, an approximate flying route 69 (see FIG. 8B) within the measurement range 68 is set by the position measuring instrument 3. The approximate flying route 69 is set by taking into consideration each overlapping ratio between images adjacent to each other in a running direction and between the approximate flying routes 69 adjacent to each other, and a photographing distance with respect to the object to be measured 66. Further, photographing positions (photographing points) or the like are set up on the approximate flying route 69, and an approximate flying plan is prepared. It is to be noted that the approximate flying route 69 may be prepared by transferring what is set on a drawing to a picked-up image, or may be directly set on the picked-up image. Further, the approximate flying plan may be prepared manually via the operation unit 54, or may be prepared automatically based on the program stored in the position measurement storage unit 58.

Here, the photographing position by the flying vehicle system 2 may be set based on a moving speed of the flying vehicle system 2 and on timing of photographing using an interval timer and the like. Further, the photographing position by the flying vehicle system 2 may be set by using coordinate data as measured by the position measuring instrument 3 or by the GPS device 8.

(Step 03) After the approximate flight plan is prepared, the approximate flying route 69 as set by the position measuring instrument 3 is measured by a scanning measurement in the non-prism measurement mode. By performing the scanning measurement on the approximate flying route 69, three-dimensional coordinates (GPS coordinates) of the surface of the object to be measured 66 on the approximate flying route 69, are measured. Further, based on the three-dimensional coordinates, the surface irregularities, the curving and the tilting on the approximate flying route 69 can be measured. Further, a portion where a measurement value could not be obtained during a process of the scanning measurement of the approximate flight route 69 by the position measuring instrument 3, that is to say the portion (an invisible portion) which is within dead angle due to a obstacle in the approximate flying route 69, is detected.

(Step 04) Based on scanning results of the approximate flying route 69 by the position measuring instrument 3, the measurement control system 45 amends the approximate flight plan. That is to say, the detailed flying route including a movement in approaching and separating directions with respect to the object to be measured 66 is calculated so that a distance between the flying vehicle system 2 and a surface of the object to be measured 66 will be at constant value, corresponding to the surface irregularities, the curving and the tilting of the surface of the object to be measured 66 (a surface to be measured). Further, the measurement control device 45 deletes the portion of the dead angle from the approximate flight plan, and prepares the detailed flight route without the portion in the dead angle.

A setting of the photographing points, a setting of the overlapping ratio and a setting of the distance between the object to be measured 66 and the flying vehicle system 2 may be set according to the detailed flying route.

As described above, the detailed flying route including the movement within the approaching and separating directions with respect to the object to be measured 66 is prepared, and further, the detailed flying route, where the dead angle is deleted, is prepared. As a result, as shown in FIG. 9, a three-dimensional detailed flying route 71 maintaining a constant distance to the surface of the object to be measured 66 is prepared. Further, the approximate flight plan is amended according to the detailed flying route 71. For instance, there are a change of position of the photographing points, increase or decrease of the number of photographing points, amendment of direction of the flying vehicle system 2 at the photographing points, etc. By the amendments of the approximate flight plan, the detailed flight plan is prepared.

In a case where radio wave from the satellite can be received, the flying vehicle system 2 flies autonomously according to the detailed flying route 71 as set based on the position information obtained by the GPS device 8.

Next, a description will be given on a case where the flying vehicle system 2 is operated to fly autonomously based on the detailed flight plan at a place where the radio wave from the satellite cannot be received. It is to be noted that the detailed flight plan is set on the flying vehicle system 2 in advance.

Under a condition where the flying vehicle system 2 is being tracked by the position measuring instrument 3, the control arithmetic unit 36 reads the detailed flying route 71 from the detailed flight plan as stored in the storage unit 38, and further, the position measuring instrument 3 transmits the measurement results to the flying vehicle system 2. The flying vehicle system 2 acquires a present positional information (GPS coordinates) of the flying vehicle system 2 by receiving the measurement result of the position measuring instrument 3.

It is to be noted that in a case where positional coordinates where the position measuring instrument 3 is installed is not known (in a case where the positional coordinates is not a known point), the flying vehicle system 2 is operated to fly in a space where the radio waves from the satellites can be received, and the GPS coordinates of two points are obtained by the GPS device 8. Further, by measuring the position of the flying vehicle system 2 at the two points respectively, GPS coordinates or absolute coordinates of the installation position of the position measuring instrument 3 can be obtained by the method of resection.

Next, the control arithmetic unit 36 compares the detailed flying route 71 with the present position of the flying vehicle system 2, and issues a flight control signal to the flight control unit 41 so that the present position will be moved along the detailed flying route 71. The flight control unit 41 controls the driving of the propeller motors 18 via the motor driver unit 43 based on the flight control signal.

Next, a photographing point (a target position) is read from the storage unit 38, and the control arithmetic unit 36 judges as to whether the target position coincides with the present position or not. In a case where a deviation is zero or within tolerance, an operation as required such as photographing by the camera 7, and the like, is carried out. When the operation as required is completed, the next photographing point (the target position) is read from the detailed flight plan, and the flight control unit 41 controls the flight of the flying vehicle system 2 in the order given so that the target position and the present position coincides with each other.

The processing as described above is repeated until the flying vehicle system 2 finishes the flight on the detailed flying route 71 of the detailed flight plan. When the operation as scheduled is completed, the flying vehicle system 2 returns to the original standby position.

During the autonomous flight of the flying vehicle system 2, there is a possibility that the flying vehicle system 2 may deviate from the detailed flying route 71 due to the influence of a wind or other cause. In this case, particularly in a case where the flying vehicle system 2 approaches to the object to be measured 66, in order to avoid a contact between the flying vehicle system 2 and the object to be measured 66, it is necessary that the flying vehicle system 2 must go back quickly to the detailed flying route 71.

In the present embodiment, it is so arranged that when the position measuring instrument 3 detects a separation of the flying vehicle system 2 from the detailed flying route 71 toward a side of the object to be measured 66, the position measuring instrument 3 issues an alarm sound. If the alarm sound is issued, the operator makes the ground base station 4 carry out a return processing for restoring the flying vehicle system 2 to the detail flying route 71. As return processing, for instance, there is a process for making the flying vehicle system 2 return to the point where the flying vehicle system 2 deviated at first from the detailed flying route 71.

By carrying out the return processing, the contact between the flying vehicle system 2 and the object to be measured 66 can be prevented.

It is to be noted that instead of the process where the operator makes the ground base station 4 carry out the return processing based on the alarm sound, it may be arranged in such a manner that the position measuring instrument 3 issues an alarm signal to the ground base station 4 at the time when the flying vehicle system 2 approaches to the object to be measured 66, and the ground base station 4 automatically carries out the return processing based on the alarm signal.

As described above, in the present embodiment, the two-dimensional approximate flying route 69 of the approximate flying plan is measured by the scanning measurement, the approximate flying plan is prepared according to the map information, the photographs, and others, and the surface irregularities, the curving and the tilting of the surface (the surface to be measured) of the object to be measured 66 along the approximate flying route 69 are measured, and the three-dimensional detailed flying route 71 including the movement in approaching and separating directions to correspond to the surface to be measured is prepared.

Therefore, regardless of the surface irregularities, the curving and the tilting of the surface to be measured of the object to be measured 66, it is possible to set the distance (offset) between the surface to be measured and the flying vehicle system 2 can be set to a constant value, as a result, the flying vehicle system 2 can fly under the condition where the flying vehicle system 2 is set closer to the surface of the object to be measured 66, and it is possible to pick up the image of the surface of the object to be measured 66 from the close-in distance where the micro cracks can be detected. As a result, it is possible to improve a detection accuracy of the cracks.

Further, in the detailed flight plan, when the scanning measurement is performed on the approximate flying route 69 by the position measuring instrument 3, a portion where scanning could not be performed on the object to be measured 66 is detected, i.e. a portion, which is in the dead angle due to obstacles, etc. is detected, a portion of the detailed flying route 71 corresponding to the invisible portion is to be deleted from the detailed flight plan, and the detailed flying route 71 without an invisible portion is prepared.

Therefore, during the autonomous flight of the flying vehicle system 2, the tracking by the position measuring instrument 3 is not interrupted, and thus it is possible to avoid a such condition where the positional information cannot be acquired by the position measuring instrument 3, and the flying vehicle system 2 can carry out the autonomous flight in stable and reliable manner.

It is to be noted that in the present embodiment, it is so arranged that the camera 7 is installed on the flying vehicle system 2 as a measuring device, and images of the object to be measured are acquired by the camera 7, while other measuring devices may be installed on the flying vehicle system 2 instead of the camera 7. For instance, a laser scanner is installed on the flying vehicle system 2 as a measuring device and it may be arranged in such a manner that the flying vehicle system 2 acquires point cloud data of the object to be measured by the laser scanner while the flying vehicle system 2 is flying along the detailed flying route 71. Or, the measuring device may be a spectral camera for carrying out investigation of geological features and investigation of growing condition of agricultural products.

Further, it is needless to say that photogrammetry may be performed on the object to be measured 66 based on the images as photographed by the camera 7 of the flying vehicle system 2. In this case, the camera 7 fulfills a function as a measuring device.

The invention claimed is:

1. A flying vehicle guiding system comprising: a flying vehicle system having a measuring device installed and capable of remotely controlling, a position measuring instrument capable of measuring distance, angle and of tracking, a ground base station for controlling a flight of a flying vehicle based on measurement result of said position measuring instrument and a control device installed on said flying vehicle or on said ground base station, wherein said flying vehicle has a retro-reflector, said position measuring instrument has a non-prism measurement function for performing a distance measurement and an angle measurement in non-prism and a prism measurement function for performing the distance measurement and the angle measurement with respect to said retro-reflector, said control device is adapted to have a flight range as set within a flat plane according to map information, drawing or image including an object to be measured, to prepare an approximate flight plan having a two-dimensional approximate flying route as set within said flight range, to measure said approximate flying route by the non-prism measurement, to calculate a three-dimensional detailed flying route based on the measurement results and said approximate flying route, to prepare a detailed flight plan including said detailed flying route and to control said flying vehicle so as to fly in maintaining a distance between said flying vehicle system and a surface of said object to be measured at a constant value based on said detailed flight plan and a result of the prism measurement.

2. The flying vehicle guiding system according to claim 1, wherein said measuring device is a camera unit and said approximate flight plan includes photographing points and overlapping ratios as set on said approximate flying route.

3. The flying vehicle guiding system according to claim 1, wherein said measuring device is a laser scanner and point cloud data are acquired by said laser scanner while said flying vehicle is flying along said detailed flying route.

4. The flying vehicle guiding system according to claim 2, wherein in said detailed flying route, a portion not capable of being measured by the non-prism measurement of said position measuring instrument is deleted.

5. The flying vehicle guiding system according to claim 1, wherein said position measuring instrument is configured to issue an alarm sound based on a detection of a separation of said flying vehicle system from said detailed flight route toward a side of said object to be measured.

6. The flying vehicle guiding system according to claim 1, wherein said flying vehicle system has a GPS device and said control device is adapted to control a flight of said flying vehicle system either according to positional information of said flying vehicle system acquired by said position measuring instrument or according to positional information of said flying vehicle system acquired by said GPS device.

7. The flying vehicle guiding system according to claim 5, wherein said flying vehicle system has a GPS device and said control device is adapted to control a flight of said flying vehicle system either according to positional information of said flying vehicle system acquired by said position measuring instrument or according to positional information of said flying vehicle system acquired by said GPS device.

8. The flying vehicle guiding system according to claim 1, wherein said flying vehicle system comprises said measuring device tiltably supported in an arbitrary direction via a gimbal mechanism and said retro-reflector integrally tilted with said measuring device in a known relation with said measuring device.

9. A flight plan preparing method using a flying vehicle system designed as remotely controllable, a control device for remotely controlling said flying vehicle system and a position measuring instrument capable of performing a non-prism measurement and a prism measurement, comprising: a step of setting a flight range within a flat plane based on a map information, a drawing, or an image including an object to be measured, a step of setting a two-dimensional approximate flying route within said flight range, a step of preparing an approximate flight plan including said approximate flying route, a step of measuring said approximate flying route by the non-prism measurement and a step of preparing a detailed flight plan including a three-dimensional detailed flying route as set based on a result of the non-prism measurement and on a setting of a distance between said object to be measured and said flying vehicle system.

10. The flight plan preparing method according to claim 9, wherein said flying vehicle system has a camera unit as a measuring device, said approximate flight plan or said approximate flying route includes a photographing point as set on said approximate flying route and overlapping ratio between images adjacent to each other in images as acquired by said camera unit.

11. The flight plan preparing method according to claim 9, wherein in said detailed flying route, a portion where distance measurement data is not acquired in the result of the non-prism measurement, is deleted.

12. The flying vehicle guiding system according to claim 2, wherein said position measuring instrument is configured to issue an alarm sound based on a detection of a separation of said flying vehicle system from said detailed flight route toward a side of said object to be measured.

13. The flying vehicle guiding system according to claim 3, wherein said position measuring instrument is configured to issue an alarm sound based on a detection of a separation of said flying vehicle system from said detailed flight route toward a side of said object to be measured.

14. The flying vehicle guiding system according to claim 4, wherein said position measuring instrument is configured to issue an alarm sound based on a detection of a separation of said flying vehicle system from said detailed flight route toward a side of said object to be measured.

15. The flying vehicle guiding system according to claim 2, wherein said flying vehicle system has a GPS device and said control device is adapted to control a flight of said flying vehicle system either according to positional information of said flying vehicle system acquired by said position measuring instrument or according to positional information of said flying vehicle system acquired by said GPS device.

16. The flying vehicle guiding system according to claim 3, wherein said flying vehicle system has a GPS device and said control device is adapted to control a flight of said flying vehicle system either according to positional information of said flying vehicle system acquired by said position measuring instrument or according to positional information of said flying vehicle system acquired by said GPS device.

17. The flying vehicle guiding system according to claim 4, wherein said flying vehicle system has a GPS device and said control device is adapted to control a flight of said flying vehicle system either according to positional information of said flying vehicle system acquired by said position measuring instrument or according to positional information of said flying vehicle system acquired by said GPS device.

18. The flying vehicle guiding system according to claim 12, wherein said flying vehicle system has a GPS device and said control device is adapted to control a flight of said flying vehicle system either according to positional information of said flying vehicle system acquired by said position measuring instrument or according to positional information of said flying vehicle system acquired by said GPS device.

19. The flying vehicle guiding system according to claim 13, wherein said flying vehicle system has a GPS device and said control device is adapted to control a flight of said flying vehicle system either according to positional information of said flying vehicle system acquired by said position measuring instrument or according to positional information of said flying vehicle system acquired by said GPS device.

20. The flying vehicle guiding system according to claim 14, wherein said flying vehicle system has a GPS device and said control device is adapted to control a flight of said flying vehicle system either according to positional information of said flying vehicle system acquired by said position measuring instrument or according to positional information of said flying vehicle system acquired by said GPS device.

21. The flying vehicle guiding system according to claim 2, wherein said flying vehicle system comprises said measuring device tiltably supported in an arbitrary direction via a gimbal mechanism and said retro-reflector integrally tilted with said measuring device in a known relation with said measuring device.

* * * * *